United States Patent
Hanley et al.

(10) Patent No.: US 9,546,266 B2
(45) Date of Patent: Jan. 17, 2017

(54) INNER LINER FOR A PNEUMATIC TIRE ASSEMBLY

(71) Applicant: BASF SE, Ludwigshafen (DE)

(72) Inventors: Stephen Hanley, Lebanon, NJ (US); Zhenguo Liu, Flanders, NJ (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/769,276

(22) PCT Filed: Mar. 4, 2014

(86) PCT No.: PCT/US2014/020244
§ 371 (c)(1),
(2) Date: Aug. 20, 2015

(87) PCT Pub. No.: WO2014/164054
PCT Pub. Date: Oct. 9, 2014

(65) Prior Publication Data
US 2016/0002453 A1    Jan. 7, 2016

Related U.S. Application Data

(60) Provisional application No. 61/779,682, filed on Mar. 13, 2013.

(51) Int. Cl.
| | |
|---|---|
| C08L 23/36 | (2006.01) |
| B60C 1/00 | (2006.01) |
| C08L 77/06 | (2006.01) |
| C08G 69/36 | (2006.01) |
| C08L 77/02 | (2006.01) |

(52) U.S. Cl.
CPC .............. *C08L 23/36* (2013.01); *B60C 1/0008* (2013.04); *C08G 69/36* (2013.01); *C08L 77/02* (2013.01); *C08L 77/06* (2013.01)

(58) Field of Classification Search
CPC ........... C08L 23/36; C08L 77/06; C08L 77/02; B60C 1/0008; C08G 69/36
See application file for complete search history.

(56) References Cited

U.S. PATENT DOCUMENTS

| | | |
|---|---|---|
| 4,121,642 A | 10/1978 | Schwartz |
| 4,130,534 A | 12/1978 | Coran et al. |
| 4,214,619 A | 7/1980 | Bowerman, Jr. et al. |
| 4,263,075 A | 4/1981 | Bowerman, Jr. et al. |
| 4,277,295 A | 7/1981 | Schmidt et al. |
| 4,284,742 A | 8/1981 | Bowerman, Jr. et al. |
| 4,396,051 A | 8/1983 | Ogawa et al. |
| 4,502,520 A | 3/1985 | Sandstrom |
| 4,725,649 A | 2/1988 | Hoshino |
| 4,811,773 A | 3/1989 | Endo et al. |
| 4,874,670 A | 10/1989 | Boon et al. |
| 4,913,209 A | 4/1990 | Hong et al. |
| 4,928,741 A | 5/1990 | Rye et al. |
| 4,966,214 A | 10/1990 | Kadota |
| 5,036,113 A | 7/1991 | Boon et al. |
| 5,040,583 A | 8/1991 | Lin et al. |
| 5,085,942 A | 2/1992 | Hong et al. |
| 5,158,627 A | 10/1992 | Saneto et al. |
| 5,228,938 A | 7/1993 | Kansupada et al. |
| 5,236,030 A | 8/1993 | Misawa et al. |
| 5,265,660 A | 11/1993 | Rye et al. |
| 5,379,819 A | 1/1995 | Adachi |
| 5,385,980 A | 1/1995 | Schaefer et al. |
| 5,392,830 A | 2/1995 | Janello et al. |
| 5,443,104 A | 8/1995 | Dollinger et al. |
| 5,665,183 A | 9/1997 | Kresge et al. |
| 5,738,158 A | 4/1998 | Ozawa et al. |
| 5,851,323 A | 12/1998 | Kaido et al. |
| 5,938,869 A | 8/1999 | Kaido et al. |
| 5,992,486 A | 11/1999 | Katsuki et al. |
| 5,992,487 A | 11/1999 | Adachi |
| 6,024,816 A | 2/2000 | Yamakawa et al. |
| 6,062,283 A | 5/2000 | Watanabe et al. |
| 6,073,669 A | 6/2000 | Takada et al. |
| 6,079,465 A | 6/2000 | Takeyama et al. |
| 6,079,466 A | 6/2000 | Watanabe et al. |
| 6,116,311 A | 9/2000 | Ueyoko et al. |
| 6,136,123 A | 10/2000 | Kaido et al. |
| 6,179,941 B1 | 1/2001 | Yamakawa et al. |
| 6,244,317 B1 | 6/2001 | Yamakawa et al. |
| 6,334,919 B1 | 1/2002 | Takeyama et al. |

(Continued)

FOREIGN PATENT DOCUMENTS

| | | |
|---|---|---|
| EP | 0 633 152 A1 | 1/1995 |
| EP | 0 722 850 A1 | 7/1996 |

(Continued)

OTHER PUBLICATIONS

Machine translation of JP 2011-255645. Nov. 2011.*
International Search Report for Application No. PCT/US2014/020244 dated Sep. 17, 2014, 3 pages.
BASF, "Ultramid HFX 33, Polyamide 6", Product Information, Feb. 2012, pp. 1-2.
BASF, "Ultramid HFX 33, Polyamide 6", Product Information, Mar. 2012, pp. 1-2.
Mitsui Chemicals Group, "Tafmer MA8510 Acid Modified Olefin Elastomer", General Information, Dec. 2011, 1 page.

(Continued)

*Primary Examiner* — John Uselding
(74) *Attorney, Agent, or Firm* — Howard & Howard Attorneys PLLC

(57) ABSTRACT

A polyamide composition comprises a polyamide, an anhydride-functional copolymer reactive with the polyamide, and a poly (ethylene-co-methacrylic acid) ionomer. A pneumatic tire assembly includes an inner liner which is formed from the polyamide composition. The inner liner comprises the reaction product of the polyamide and the anhydride-functional copolymer, as well as the (ethylene-co-methacrylic acid) ionomer.

9 Claims, No Drawings

(56) References Cited

U.S. PATENT DOCUMENTS

| | | |
|---|---|---|
| 6,359,071 B1 | 3/2002 | Watanabe et al. |
| 6,402,867 B1 | 6/2002 | Kaido et al. |
| 6,427,743 B1 | 8/2002 | Ueyoko et al. |
| 6,538,066 B2 | 3/2003 | Watanabe et al. |
| 6,609,550 B2 | 8/2003 | Suzuki |
| 6,617,383 B2 | 9/2003 | Ikawa et al. |
| 6,719,026 B2 | 4/2004 | Suzuki |
| 6,788,192 B2 | 9/2004 | Shimura |
| 6,827,115 B1 | 12/2004 | Van Hoose |
| 6,843,292 B2 | 1/2005 | Wang |
| 6,861,470 B2 | 3/2005 | Watanabe et al. |
| 6,877,538 B2 | 4/2005 | Scheuren |
| 6,908,958 B2 | 6/2005 | Maruyama et al. |
| 6,913,052 B2 | 7/2005 | Losey |
| 6,962,183 B2 | 11/2005 | Ueyoko et al. |
| 6,964,719 B1 | 11/2005 | Van Hoose |
| 7,019,063 B2 | 3/2006 | Wada et al. |
| 7,040,366 B2 | 5/2006 | Minami et al. |
| 7,060,146 B2 | 6/2006 | Ikeda et al. |
| 7,117,911 B2 | 10/2006 | Kanenari et al. |
| 7,128,114 B2 | 10/2006 | Suzuki |
| 7,163,736 B2 | 1/2007 | Takahashi |
| 7,172,002 B2 | 2/2007 | Ueyoko et al. |
| 7,275,574 B2 | 10/2007 | Watanabe et al. |
| 7,284,582 B2 | 10/2007 | Zanzig et al. |
| 7,409,974 B2 | 8/2008 | Colantonio et al. |
| 7,459,212 B2 | 12/2008 | Yamakawa et al. |
| 7,604,031 B2 | 10/2009 | Zanzig et al. |
| 7,704,343 B2 | 4/2010 | Kanenari |
| 7,712,499 B2 | 5/2010 | Yano et al. |
| 7,798,188 B2 | 9/2010 | Sakai et al. |
| 7,976,666 B2 | 7/2011 | Morooka |
| 8,021,728 B2 | 9/2011 | Soeda et al. |
| 8,056,595 B2 | 11/2011 | Morooka |
| 8,129,453 B2 | 3/2012 | Hara et al. |
| 8,158,705 B2 | 4/2012 | Sugimoto |
| 8,737,880 B2 | 5/2014 | Uehara |
| 8,801,884 B2 | 8/2014 | Hashimura et al. |
| 2002/0056495 A1 | 5/2002 | Hiruma |
| 2004/0031550 A1 | 2/2004 | Kanenari et al. |
| 2004/0084120 A1 | 5/2004 | Arnold et al. |
| 2004/0226643 A1 | 11/2004 | Yagi et al. |
| 2005/0148718 A1 | 7/2005 | Ishida et al. |
| 2005/0173041 A1 | 8/2005 | Miki |
| 2006/0042740 A1 | 3/2006 | Takahashi et al. |
| 2006/0060284 A1 | 3/2006 | Zanzig et al. |
| 2006/0118227 A1 | 6/2006 | Miki |
| 2006/0254695 A1 | 11/2006 | Higuchi et al. |
| 2007/0209744 A1 | 9/2007 | Matsumura |
| 2007/0221287 A1 | 9/2007 | Izumoto |
| 2008/0047646 A1 | 2/2008 | Hong et al. |
| 2008/0078490 A1 | 4/2008 | Hashimoto |
| 2008/0105352 A1 | 5/2008 | Ueyoko et al. |
| 2008/0142141 A1 | 6/2008 | Takahashi |
| 2008/0314490 A1 | 12/2008 | Morooka |
| 2008/0314491 A1 | 12/2008 | Soeda et al. |
| 2008/0314492 A1 | 12/2008 | Tsou et al. |
| 2008/0314493 A1 | 12/2008 | Hara |
| 2009/0038727 A1 | 2/2009 | Hong |
| 2009/0038728 A1 | 2/2009 | Kanenari |
| 2009/0038729 A1 | 2/2009 | Soeda et al. |
| 2009/0065118 A1 | 3/2009 | Morooka |
| 2009/0084482 A1 | 4/2009 | Majumdar et al. |
| 2009/0084483 A1 | 4/2009 | Majumdar et al. |
| 2009/0126847 A1 | 5/2009 | Kobayashi |
| 2009/0139623 A1 | 6/2009 | Kaiser |
| 2009/0151841 A1 | 6/2009 | Jones et al. |
| 2009/0151846 A1 | 6/2009 | Zhao et al. |
| 2009/0173431 A1 | 7/2009 | Hashimura et al. |
| 2009/0205766 A1 | 8/2009 | Matsuda |
| 2009/0205770 A1 | 8/2009 | Matsuda |
| 2009/0211683 A1 | 8/2009 | Takahashi |
| 2009/0242094 A1 | 10/2009 | Kato et al. |
| 2009/0283195 A1 | 11/2009 | Reese et al. |
| 2009/0288750 A1 | 11/2009 | Majumdar et al. |
| 2009/0308523 A1 | 12/2009 | Kuramori |
| 2009/0311548 A1 | 12/2009 | Kirino |
| 2009/0314403 A1 | 12/2009 | Tanno |
| 2009/0320983 A1 | 12/2009 | Sawada et al. |
| 2010/0018622 A1 | 1/2010 | Tanno et al. |
| 2010/0024938 A1 | 2/2010 | Ishiyama |
| 2010/0036028 A1 | 2/2010 | Morooka |
| 2010/0043937 A1 | 2/2010 | Matsunaga et al. |
| 2010/0089514 A1 | 4/2010 | Fukushima |
| 2010/0099821 A1 | 4/2010 | Soeda et al. |
| 2010/0108221 A1 | 5/2010 | Shibata et al. |
| 2010/0108229 A1 | 5/2010 | Hata |
| 2010/0130663 A1 | 5/2010 | Taguchi et al. |
| 2010/0147431 A1 | 6/2010 | Morooka |
| 2010/0147432 A1 | 6/2010 | Morooka |
| 2010/0147440 A1 | 6/2010 | Matsunaga |
| 2010/0154960 A1 | 6/2010 | Kishizoe |
| 2010/0175802 A1 | 7/2010 | Morooka |
| 2010/0181003 A1 | 7/2010 | Inoue |
| 2010/0186866 A1 | 7/2010 | Tomoi |
| 2010/0193098 A1 | 8/2010 | Kirino |
| 2010/0212801 A1 | 8/2010 | Matsunaga |
| 2011/0011511 A1 | 1/2011 | Miyazaki et al. |
| 2011/0077357 A1* | 3/2011 | Sugimoto ............ B60C 1/0008 525/89 |
| 2012/0015182 A1 | 1/2012 | Caraway et al. |

FOREIGN PATENT DOCUMENTS

| | | | |
|---|---|---|---|
| EP | 0 842 793 A1 | 5/1998 | |
| EP | 1 145 872 A2 | 10/2001 | |
| EP | 1 987 962 A1 | 11/2008 | |
| EP | 2 000 292 A1 | 12/2008 | |
| EP | 2 455 423 A1 | 5/2012 | |
| JP | H 07-070372 A | 3/1995 | |
| JP | H 08-216285 A | 8/1996 | |
| JP | H 08-216286 A | 8/1996 | |
| JP | H 08-216610 A | 8/1996 | |
| JP | H 08-217922 A | 8/1996 | |
| JP | H 08-217923 A | 8/1996 | |
| JP | H 08-259741 A | 10/1996 | |
| JP | 2007-320992 A | 12/2007 | |
| JP | 2009-220460 A | 10/2009 | |
| JP | 2010-013543 A | 1/2010 | |
| JP | 2010-013617 A | 1/2010 | |
| JP | 2011-255645 * | 11/2011 | ............ B32B 25/08 |
| WO | WO 98/56598 A1 | 12/1998 | |
| WO | WO 02/36367 A1 | 5/2002 | |
| WO | WO 2004/050391 A1 | 6/2004 | |
| WO | WO 2006/001660 A1 | 1/2006 | |
| WO | WO 2006/001680 A1 | 1/2006 | |
| WO | WO 2007/081323 A1 | 7/2007 | |
| WO | WO 2008/029779 A1 | 3/2008 | |
| WO | WO 2011/122876 A2 | 10/2011 | |
| WO | WO 2012/009044 A1 | 1/2012 | |

OTHER PUBLICATIONS

Polysciences, Inc., "Technical Data Sheet 449-Anhydride-Functional Polymers", Dec. 1999, 1 page.

English language abstract and machine-assisted English translation for JPH 07-070372 extracted from espacenet.com database on Aug. 27, 2015, 12 pages.

English language abstract for JPH 08-216285 extracted from espacenet.com database on Aug. 27, 2015, 2 pages.

English language abstract and machine-assisted English translation for JPH 08-216286 extracted from espacenet.com database on Aug. 27, 2015, 25 pages.

English language abstract and machine-assisted English translation for JPH 08-216610 extracted from espacenet.com database on Aug. 27, 2015, 22 pages.

English language abstract and machine-assisted English translation for JPH 08-217922 extracted from espacenet.com database on Aug. 27, 2015, 23 pages.

English language abstract and machine-assisted English translation for JPH 08-217923 extracted from espacenet.com database on Aug. 27, 2015, 20 pages.

(56) References Cited

OTHER PUBLICATIONS

English language abstract and machine-assisted English translation for JPH 08-259741 extracted from espacenet.com database on Aug. 27, 2015, 22 pages.

English language abstract and machine-assisted English translation for JP 2007-320992 extracted from the PAJ database on Aug. 27, 2015, 20 pages.

English language abstract and machine-assisted English translation for JP 2009-220460 extracted from espacenet.com database on Aug. 27, 2015, 14 pages.

English language abstract and machine-assisted English translation for JP 2010-013543 extracted from espacenet.com database on Aug. 27, 2015, 11 pages.

English language abstract for JP 2010-013617 extracted from espacenet.com database on Aug. 27, 2015, 2 pages.

English language abstract for WO 2008/029779 extracted from espacenet.com database on Aug. 27, 2015, 2 pages.

English language abstract for WO 2011/122876 extracted from espacenet.com database on Aug. 27, 2015, 2 pages.

* cited by examiner

INNER LINER FOR A PNEUMATIC TIRE ASSEMBLY

RELATED APPLICATIONS

This application is the National Stage of International Patent Application No. PCT/US2014/020244, filed on Mar. 4, 2014, which claims priority to and all the advantages of U.S. Patent Application No. 61/779,682, filed on Mar. 13, 2013, the content of which is incorporated herein by reference.

FIELD OF THE DISCLOSURE

The present disclosure generally relates to an inner liner for a pneumatic tire assembly. The inner liner is formed from a polyamide composition.

BACKGROUND OF THE DISCLOSURE

Environmental concerns and recent increases in the cost of fuel have highlighted a need for fuel efficient vehicles. Since pneumatic tires significantly impact fuel efficiency of vehicles, one way of addressing this need for fuel efficient vehicles is through improvement of pneumatic tires.

Typically, a pneumatic tire includes an inner liner. As part of a pneumatic tire, the inner liner functions as a bladder, which prevents gas from leaking out of the pneumatic tire thereby maintaining tire pressure within the pneumatic tire.

As tire pressure in a pneumatic tire decreases, so does fuel efficiency. Technically, a pneumatic tire's ability to maintain air pressure is related to the permeability of its inner liner. Permeability measurements determine how much permeate (typically air) penetrates the inner liner in a specific time, dependent on the type of permeate, pressure, temperature, and thickness and surface area of the inner liner.

The inner liner is typically formed from a halogenated rubber composition, most often a halogenated butyl rubber compound. The halogenated rubber compositions used to form inner liners have changed very little over the past 50 years. Despite having relatively low permeability compared to inner liners formed from materials used in the distant past, inner liners formed from halogenated butyl rubber compounds still allow gas to permeate out of pneumatic tires, which causes a decrease in tire pressure over time. That is, although inner liners comprising halogenated rubbers have low permeability relative to many other polymeric materials, i.e., they function fairly well to prevent gas from quickly leaking out of pneumatic tires, improvements are still required to decrease the permeability of tires and subsequently minimize decreases in tire pressure over time to improve fuel efficiency.

Further, inner liners comprising halogenated butyl rubber may also exhibit hysteresis loss, i.e., a loss in resiliency, which leads to an increased rolling resistance and decreased fuel efficiency. To improve physical properties, like hysteresis loss, fillers are typically compounded into the halogenated rubbers which are used to form inner liners. The use of fillers increases the density and thus the weight of the inner liner, which, in turn, decreases the fuel efficiency.

In an attempt to solve these problems created by the permeability and resiliency of materials typically used to form inner liners, alternative materials have been suggested. However, materials suggested up to this point do not have all of the physical properties required of an inner liner, such as temperature resistance, or further require changes to the pneumatic tire assembly, which impact cost.

Accordingly, there remains an opportunity to develop an improved inner liner which is significantly impermeable, resilient, temperature resistant, and light weight.

SUMMARY OF THE DISCLOSURE AND ADVANTAGES

The instant disclosure provides a polyamide composition for forming an inner liner for a pneumatic tire. The polyamide composition comprises: (A) a polyamide; (B) an anhydride-functional copolymer reactive with the polyamide; (C) a poly (ethylene-co-methacrylic acid) ionomer; and (D) a synthetic wax. A weight ratio of (A+B):C in the polyamide composition is from 2:1 to 4:1 and a weight ratio of C:D in the polyamide composition is from 10:1 to 100:1.

The instant disclosure also provides an inner liner for a pneumatic tire assembly. The inner liner comprises the reaction product of the polyamide and the anhydride-functional copolymer, as well as the poly (ethylene-co-methacrylic acid) ionomer.

Due to its chemical makeup, the inner liner of this disclosure exhibits excellent performance properties. The reaction product of the polyamide and the anhydride-functional copolymer is covalently bonded and durable. The ionomer forms ionic bonds with the reaction product of the polyamide and the anhydride-functional copolymer further contributing to strength and structural resilience of the inner liner. Because the ionomer is not covalently bonded to the polyamide, it interacts ionically with the reaction product of the polyamide and the anhydride-functional copolymer, which leads to increased homogeneity and improved physical properties of the inner liner. Accordingly, the inner liner of the subject disclosure is impermeable, resilient, temperature resistant, and light weight.

DETAILED DESCRIPTION OF THE DISCLOSURE

The subject disclosure provides a polyamide composition, an inner liner for a pneumatic tire assembly, a process of forming an inner liner for a pneumatic tire assembly, and a pneumatic tire assembly. The polyamide composition comprises a polyamide, an anhydride-functional copolymer reactive with the polyamide, a poly (ethylene-co-methacrylic acid) ionomer, and a synthetic wax. The inner liner comprises the reaction product of the polyamide and the anhydride-functional copolymer, as well as the (ethylene-co-methacrylic acid) ionomer. Typically, the inner liner is used in conjunction with pneumatic tires for consumer, lawn care, agricultural, and construction machines including, but not limited to, automobiles, trucks, tractors, and the like. The inner liner may be of unitary construction or many include two or more components, e.g., layers, connected together. Typically, the inner liner is of unitary construction, i.e., it is one piece.

The polyamide composition comprises a polyamide, an anhydride-functional copolymer reactive with the polyamide, a poly (ethylene-co-methacrylic acid) ionomer, and, in one embodiment, a synthetic wax. The polyamide includes one or more polyamides. The polyamide typically includes one or more polyamides selected from the group of polyamide 6, polyamide 6,6, polyamide 6/66, and combinations thereof. Polyamide 6 is also known as polycaprolactam and is commercially available from BASF Corporation under the trade names ULTRAMID® B, ULTRAMID® B27, ULTRAMID® B32, ULTRAMID® B33, ULTRAMID® B36 ULTRAMID® B36 LN, ULTRAMID® B40 L and ULTRAMID® B40 LN. Polyamide 6,6 is the reaction product of hexamethylene diamine and adipic acid and is commercially available from BASF Corporation under the trade names ULTRAMID® A, ULTRAMID® A27 E 01, ULTRAMID® A34 01, and ULTRAMID® A44 01. Polyamide 6/66 is a co-polymer of polyamide 6 and polyamide 66 and is commercially available from BASF Corporation under the trade name of ULTRAMID® C, ULTRAMID® C33 01, ULTRAMID® C33L 01, ULTRAMID® C33LN 01, ULTRAMID® C40 L 01, and ULTRAMID® C40LX 01.

The polyamide is typically present in the polyamide composition in an amount of from 30 to 75, more typically from 35 to 70, and most typically from 50 to 65, parts by weight per 100 parts by weight of the polyamide composition. Further, it is to be appreciated that more than one polyamide may be included in the polyamide composition, in which case the total amount of all polyamides present in the polyamide composition is within the above ranges.

As described above, the polyamide composition also comprises an anhydride-functional copolymer, such as a maleic anhydride modified ethylene-octene copolymer. By "anhydride-functional" copolymer is meant that the copolymer is contacted with an anhydride-functional group, under various conditions, to cause all or part of the functional group to incorporate, graft, bond to, physically attach to, and/or chemically attach to the copolymer. The anhydride-functional copolymer is reactive with the polyamide. That is, the anhydride-functional group of the anhydride-functional copolymer reacts with the amino end groups of the polyamide to form a reaction product which can be referred to as a graft copolymer. The anhydride-functional copolymer can be a copolymer having anhydride-functionality grafted thereon, as described above, or can be the polymerization product of an anhydride function moiety. That is "anhydride-functional" is also defined to include copolymers directly polymerized from monomers comprising olefin monomers and a monomer containing a anhydride functional group, (or using initiators having a functional group) to produce a copolymer having an anhydride functional group.

Examples of particularly preferred anhydride functional groups include, but are not limited to, maleic anhydride, phthalic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride, and 4-methyl-4-cyclohexene-1,2-dicarboxylic anhydride, itaconic anhydride, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid anhydride, tetrahydrophtalic anhydride, norborn-5-ene-2,3-dicarboxylic acid anhydride, nadic anhydride, methyl nadic anhydride, himic anhydride, methyl himic anhydride, and x-methyl-bicyclo(2.2.1)hept-5-ene-2,3-dicarboxylic acid anhydride (XMNA).

The anhydride-functional copolymer is preferably formed by grafting maleic anhydride onto a saturated copolymer, typically via extrusion. Maleic anhydride-functional polymers are preferred because of the high reactivity of the maleic anhydride group with the amino group of the polyamide. In one embodiment, the anhydride-functional copolymer is a maleic anhydride modified ethylene-octene copolymer. In this embodiment, the maleic anhydride modified ethylene-octene copolymer typically includes less than 5%, typically less than 4%, typically less than 3%, typically less than 2%, and most typically from 0.2 to 1.5% by weight maleic anhydride. Further, the maleic anhydride modified ethylene-octene copolymer of this embodiment typically includes melt-grafted maleic anhydride and is typically further defined as having a linear molecular structure.

The physical properties, e.g. low temperature impact strength and high elongation at break, of the polyamide composition can be attributed to (1) good dispersion of the maleic anhydride modified ethylene-octene copolymer (impact modifier), (2) chemical interaction between the maleic anhydride modified ethylene-octene copolymer and the polyamide and (3) the low crystallinity of the maleic anhydride modified ethylene-octene copolymer.

Dispersion of the impact modifier is influenced by the viscosities of both the polyamide and the maleic anhydride modified ethylene-octene copolymer and the method of mixing (compounding). The viscosities can be measured by melt index or capillary rheometry methods.

The chemical interaction between the maleic anhydride modified ethylene-octene copolymer and the polyamide, e.g. the chemical reaction between the maleic anhydride and the amine end groups of the polyamide, allows for transfer of impact stresses from the relatively rigid polyamide to the elastic impact modifier.

Ethylene octene copolymers with higher octene content have lower crystallinity, which improves low temperature impact strength. Ethylene-octene copolymers including less than 0.2% by weight maleic anhydride typically have inferior low temperature impact strength.

The anhydride-functional copolymer is typically present in the polyamide composition in an amount of from 5 to 55, more typically from 10 to 45, and most typically from 15 to 35, parts by weight per 100 parts by weight of the polyamide composition. Further, it is to be appreciated that more than one anhydride-functional copolymer may be included in the polyamide composition, in which case the total amount of all anhydride-functional copolymers present in the polyamide composition is within the above ranges.

As described above, the polyamide composition also comprises an ionomer, such as a poly (ethylene-co-methacrylic acid) ionomer. The ionomer is added to the polyamide composition to improve the durability (abrasion resistance), tensile properties, and high temperature performance of the inner liner formed therefrom. Without being bound by theory, it is believed that the ionomer further introduces "ionic" cross-linking through the metal ions. The properties that the ionomer imparts on the inner liner are partially dependent on the properties of the other components of the polyamide composition, e.g., the polyamide and the maleic anhydride function polymer as well as the processing parameters under which the inner liner was formed.

The ionomer is typically produced by copolymerizing an olefin and a carboxylic acid to produce a copolymer having the acid units randomly distributed along the polymer chain. In some instances, an additional monomer such as acrylic ester, may be incorporated to form a terpolymer. For example, a terpolymer may be produced by polymerizing an olefin, an acrylate, and a carboxylic acid. Suitable olefins for use in preparing the ionomeric resins include, but are not limited to, ethylene, propylene, butene-1, hexene-1, and the like. Unsaturated carboxylic acids include, but are not limited to acrylic, methacrylic, ethacrylic, α-chloroacrylic, and the like. Suitable acrylates for use in preparing ionomeric terpolymers include, but are not limited to, butyl acrylate, ethyl acrylate, methyl acrylate methyl methacrylate, 2-ethylhexyl acrylate and the like. The ionomer typically comprises one or more α-olefins and typically from 5 to 40, and more typically from 8 to 15, % by weight of ethylenically unsaturated mono- or dicarboxylic acid, the basic copolymer neutralized with metal ions to the extent desired. Typically at least 20, more typically from 30 to 90, % of the carboxylic acid groups of the ionomer are neutralized by the metal ions, such as sodium, potassium, zinc, calcium, magnesium, and the like, and exist in the ionic state. In one embodiment, the ionomer is further defined as a poly (ethylene-co-methacrylic acid) ionomer zinc complex, i.e., is neutralized by zinc.

The ionomer is typically present in the polyamide composition in an amount of from 5 to 55, more typically from 15 to 45, and most typically from 20 to 35, parts by weight per 100 parts by weight of the polyamide composition. Of course, two or more types of ionomers may be included in the polyamide composition. As such, it is to be appreciated that more than one ionomer may be included in the polyamide composition, in which case the total amount of all ionomers present in the polyamide composition is within the above ranges.

In one embodiment, the ionomer is further defined as a poly (ethylene-co-methacrylic acid) ionomer. In this embodiment, the poly (ethylene-co-methacrylic acid) ionomer is typically present in the polyamide composition in an amount of from 5 to 55, more typically from 10 to 45, and most typically from 15 to 35, parts by weight per 100 parts by weight of the polyamide composition.

As described above, the polyamide composition optionally includes one or more synthetic waxes which can also be referred to as lubricants. The word "wax" as used herein refers to a class of chemical compounds that are plastic (malleable) near ambient temperatures. Waxes typically melt above 45° C. (113° F.) to give a low viscosity liquid. Waxes are also typically insoluble in water but soluble in organic, nonpolar solvents. All waxes are organic compounds, both synthetic and naturally occurring. The synthetic wax is added to the polyamide composition to improve the processability of the polyamide composition and the physical properties of the inner liner formed therefrom.

There are various types of synthetic waxes, such polyethylene waxes (based on polyethylene), Fischer-Tropsch waxes, chemically modified waxes (usually esterified or saponified), substituted amide waxes, polymerized α-olefins, and metal stearates. As such, the polyamide composition typically comprises a synthetic wax selected from the group of polyethylene waxes, Fischer-Tropsch waxes, chemically modified waxes, substituted amide waxes, polymerized α-olefins, metal stearates, and combinations thereof.

The polyamide composition can include a substituted amide wax, such as N, N-ethylene bis-stearamide. Substituted amide waxes are the reaction product of fatty acid amidation and have unique properties such as a relatively high melting point and amide functionality. When included in the resin composition, N, N-ethylene bis-stearamide improves the physical properties of the inner liner, such as elongation at break, and functions as an internal-external lubricant during melt processing. In a preferred embodiment, the substituted amide wax comprises N, N-ethylene bis-stearamide and has a melting point of from 130 to 150° C., an acid number of from 5 to 10 mg KOH/g when tested in accordance with ASTM D974.

In various preferred embodiments, the composition can comprise a synthetic wax selected from the group of substituted amide waxes, metal stearates, and combinations thereof. For example, in another preferred embodiment, the polyamide composition includes a mixture of N, N-ethylene bis-stearamide and sodium stearate.

The synthetic wax is typically present in the polyamide composition in an amount of from 0.1 to 10, more typically from 0.2 to 5, still more typically from 0.3 to 3, and most typically from 0.3 to 2.0, parts by weight per 100 parts by weight of the polyamide composition. Further, it is to be appreciated that more than one synthetic wax may be included in the polyamide composition, in which case the total amount of all synthetic waxes present in the polyamide composition is within the above ranges.

Without being bound by theory, it is believed that the synthetic wax compatibilizes the components, i.e., the polyamide, the anhydride-functional copolymer, and the ionomer. As such, the physical properties of the composition and the article, e.g., inner liner, formed therefrom are significantly improved. Further, it also believed that the incorporation of the synthetic wax into the polyamide composition eliminates the need to use plasticizer in the polyamide composition. Plasticizers tend to leach out over time and can negatively impact physical properties of the composition and the article formed therefrom. In one embodiment, the polyamide composition is substantially free of plasticizer. The terminology "substantially free," as used immediately above, refers to an amount of plasticizer of less than 0.1 parts by weight per 100 parts by weight of the polyamide composition.

Furthermore, the polyamide composition can also include an additive that is not a polyamide, an anhydride-functional copolymer, a poly (ethylene-co-methacrylic acid) ionomer, or a synthetic wax. The additive may include, but is not limited to, oxidative and thermal stabilizers, release agents, flame-retarding agents, oxidation inhibitors, oxidation scavengers, neutralizers, antiblock agents, dyes, pigments and other coloring agents, ultraviolet light absorbers and stabilizers, reinforcing agents, nucleators, plasticizers, hot melt adhesives, and combinations thereof. Suitable oxidative and thermal stabilizers include, but are not limited to, metal halides, such as sodium halides, potassium halides, lithium halides, cuprous halides, as well as corresponding chlorides, bromides, and iodides, respectively, and combinations thereof. Also, hindered phenols, hydroquinones, aromatic amines, and combinations thereof may be included. Exemplary plasticizers include, but are not limited to, lactams such as caprolactam and lauryl lactam, sulfonamides such as ortho- and para-toluenesulfonamide and N-ethyl, N-butyl-benzene sulfonamide, N-(2-hydroxypropyl) benzene sulfonamide, polyethylene glycol di-2-ethylhexoate, and combinations thereof, as well as other plasticizers known in the art. If utilized, the additive is typically present in an amount of from 0.5 to 15, more typically in an amount of from 1.0 to 10, and most typically in an amount of from 1.5 to 7.5, parts by weight per 100 parts by weight of the polyamide composition.

In one embodiment, the polyamide composition consists of: (A) the polyamide; (B) the anhydride-functional copolymer; (C) the poly (ethylene-co-methacrylic acid) ionomer; and (D) the synthetic wax. In this embodiment, the ratio of (A+B):C is typically from 1:1 to 5:1, more typically from 2:1 to 4:1, and most typically 3:1 to 4:1, and the ratio of C:D is typically from 10:1 to 100:1, more typically from 18:1 to 70:1, and most typically from 30:1 to 70:1.

As used herein, "consisting essentially of" is meant to exclude any element or combination of elements, as well as any amount of any element or combination of elements, that would alter the basic and novel characteristics of the polyamide composition. In one embodiment, the polyamide composition consists essentially of the polyamide, the anhydride-functional copolymer, the poly (ethylene-co-methacrylic acid) ionomer, and the synthetic wax. In this embodiment, the polyamide composition is substantially free from other polymers known in the art (including elastomers), fillers known in the art (including reinforcing fillers), and plasticizers known in the art. The terminology "substantially free," as used immediately above, refers to an amount of less than 0.1, parts by weight per 100 parts by weight of the polyamide composition.

In another embodiment, the polyamide composition consists essentially of: (A) the polyamide; (B) the anhydride-functional copolymer; (C) the poly (ethylene-co-methacrylic acid) ionomer; and (D) the synthetic wax. In this embodiment, the ratio of (A+B):C is typically from 1:1 to 5:1, more typically from 2:1 to 4:1, and most typically 3:1 to 4:1 and the ratio of C:D is typically from 10:1 to 100:1, more typically from 18:1 to 70:1, and most typically from 30:1 to 70:1.

In addition to the polyamide composition, the subject disclosure also includes an inner liner for a pneumatic tire assembly, which is formed from the polyamide composition described above. The inner liner for a pneumatic tire assembly comprises the reaction product of the polyamide and the anhydride-functional copolymer and the poly (ethylene-co-methacrylic acid) ionomer, and, optionally, a synthetic wax. The reaction product of the polyamide and the anhydride-functional copolymer and the poly (ethylene-co-methacrylic acid) ionomer is typically present in the inner liner in an amount of from 15 to 99, more typically from 30 to 99, and most typically from 60 to 98, parts by weight per 100 parts by weight of the inner liner. Of course, the poly (ethylene-co-methacrylic acid) ionomer is typically present in the inner liner in an amount of from 5 to 55, more typically from 10 to 45, and most typically from 15 to 35, parts by weight per 100 parts by weight of the inner liner and the synthetic wax, if present, is typically present in the inner liner in an amount of from 0.1 to 10, more typically from 0.2 to 5, still more typically from 0.3 to 3, and most typically from 0.3 to 2.0, parts by weight per 100 parts by weight of the inner liner.

The inner liner is relatively low density. That is, the inner liner typically has a specific gravity of from 0.8 to 1.15, more typically from 0.9 to 1.10, and most typically from 1.0 to 1.05, g/cm$^3$.

The inner liner typically has a melt flow rate of from 0.5 to 15, more typically from 1 to 10, and most typically from 1 to 5, g/10 minutes when tested in accordance with ISO 1133 and typically has a flexural modulus at a room temperature of from 350 to 700, more typically of from 450 to 600, and most typically from 500 to 550, MPa when tested in accordance with ISO 178. Melt viscosity and flexural modulus impact processability of the inner liner.

The inner liner of the subject disclosure has excellent permeation properties while possessing exceptional durability. With specific regard to the barrier properties of the inner liner, the inner liner typically has an oxygen permeation rate of less than 100, more typically of from 1 to 15, and most typically from 2 to 10, cm$^3$•mm/(m$^2$•day) when tested in accordance with ASTM F3985. With specific regard to the strength and elasticity, the inner liner typically has a tensile strength at 50% elongation of from 5 to 50, more typically from 8 to 40, and most typically from 10 to 30, MPa when tested in accordance with ISO 527. The inner liner typically has an elongation at break of greater than 200, more typically of from 300 to 700, and most typically from 400 to 600, % when tested in accordance with ISO 527.

In various embodiments, as part of a pneumatic tire assembly, the inner liner can comprise 1 or more layers. The 1 or more layers can be different, so long as at least 1 layer of the inner liner is formed from the polyamide composition described above. The inner liner of the subject disclosure can comprise an inner liner adhesive composition. Further, the inner liner comprising the reaction product of the polyamide and the anhydride-functional copolymer and the poly (ethylene-co-methacrylic acid) ionomer, and, optionally, a synthetic wax can be used with the inner liner adhesive composition in any way, by using any known lamination technique. For example, the inner liner comprising the inner liner adhesive composition can be formed via multi-layer co-extrusion of the polyamide composition and the inner liner adhesive composition. Optionally, the adhesive layer can be applied to the polyamide composition by dip coating, spray coating or by other methods used to apply adhesives.

In addition to the inner liner for a pneumatic tire assembly, the subject disclosure also includes a method of forming an inner liner comprising the steps of compounding the polyamide, the anhydride-functional copolymer, and the poly (ethylene-co-methacrylic acid) ionomer and forming the inner liner therefrom. Typically, the method of forming the inner liner includes the steps of compounding the polyamide composition via twin-screw extrusion and forming the inner liner from the compounded polyamide composition via cast or blown film extrusion. During the cast film extrusion process, the polyamide composition is fed through a slot die of a given thickness and is quenched on a chill roll upon exiting the die to form a polyamide composition film. The polyamide composition film may pass over multiple chill rollers before being wound onto a spool.

Compounding the polyamide composition includes the step of combining the polyamide, the anhydride-functional copolymer, the poly (ethylene-co-methacrylic acid) ionomer, and the synthetic wax. The step of combining may occur through any method known in the art including, but not limited to, direct extrusion, belt extrusion, reaction extrusion, reaction injection molding, vertical mixing, horizontal mixing, feed mixing, and combinations thereof. In one embodiment, the step of combining is further defined as combining the polyamide, the anhydride-functional copolymer, the poly (ethylene-co-methacrylic acid) ionomer, and, optionally, the synthetic wax in a twin-screw extruder. Compounding the polyamide composition may cause all or some of the polyamide to react with the anhydride-functional copolymer.

Compounding the polyamide composition may also include the step of heating the polyamide composition including the polyamide, the anhydride-functional copolymer, the poly (ethylene-co-methacrylic acid) ionomer, and the synthetic wax while in the compounding device, outside of the compounding device, or both outside of the compounding device and in the compounding device.

The method of forming the inner liner may also include the step of pelletizing, dicing, or granulating. the compounded polyamide composition. For example, the compounded polyamide composition may be pelletized with an underwater pelletizer or a strand pelletizer.

As described above, the method of forming the inner liner includes the step of forming the inner liner from the polyamide composition. Typically, the polyamide composition, usually in the form of pellets, is extruded into film or thin sheets and the inner liner is formed therefrom. However, the method of forming the inner liner is not limited to extrusion processes. For example, the inner liner can be injection molded. The method of forming the inner liner optionally includes the step of laminating the inner liner adhesive composition and the polyamide composition to form the inner liner. The inner liner adhesive composition can be laminated onto the polyamide composition with processes such as multi-layer co-extrusion, multi-layer inflation molding, etc.

The following examples are intended to illustrate the instant disclosure and are not to be viewed in any way as limiting to the scope of the instant disclosure.

EXAMPLES

A Polyamide Composition is formed according to the subject disclosure. The formula of the Polyamide Composition is set forth in Table 1 below. The Polyamide Composition, including a polyamide, an anhydride-functional copolymer reactive with the polyamide, a poly (ethylene-co-methacrylic acid) ionomer, and a synthetic wax is compounded with a twin screw extruder. Immediately following compounding/extrusion the Polyamide Composition is pelletized. Once pelletized, the Polyamide Composition is dried and extruded into test sheets using a single screw extrusion cast film line. The test sheets are aged for 23 minutes at 170° C. to simulate the curing stage of the tire manufacturing process. The polyamide and the anhydride-functional copolymer react during compounding and the subsequent extrusion and heating processes to form an article, such as an inner liner. The test sheets, now comprising the reaction product of the polyamide and the anhydride-functional copolymer, the poly (ethylene-co-methacrylic acid) ionomer, and the synthetic wax, and additives are analyzed to determine physical/performance properties.

Referring now to Table 1, the amount and type of each component used to form the Polyamide Composition is indicated with all values in parts by weight based on 100 parts by weight of the Polyamide Composition.

TABLE 1

| Polyamide Composition | |
|---|---|
| Polyamide | 58.50 |
| Anhydride Functional Copolymer | 20.00 |
| Poly (ethylene-co-methacrylic acid) Ionomer | 20.00 |
| Synthetic Wax 1 | 0.50 |
| Synthetic Wax 2 | 0.50 |
| Additive 1 | 0.50 |

Polyamide is polyamide 6/66.

Anhydride-functional Copolymer is a Maleic Anhydride Modified Ethylene-Octene Copolymer.

Poly (ethylene-co-methacrylic acid) Ionomer is a zinc ionomer of ethylene methyacrylic acid copolymer.

Synthetic Wax 1 is N, N-ethylene bis-stearamide.

Synthetic Wax 2 is sodium stearate.

Additive 2 is a thermal stabilizer.

The Polyamide composition is compounded on a twin-screw, co-rotating extruder. As is well known in the art, compounding is a technique to prepare mixtures. Here, the twin-screw extruder is used to form strands of the mixture of the Polyamide Composition. The twin-screw extruder includes two screws that rotate clockwise at a certain speed (RPM) in a metal barrel to move a mixture of components including the polyamide, the anhydride-functional copolymer, the poly (ethylene-co-methacrylic acid) ionomer, and the synthetic wax. The barrel and screws provides bearing surfaces where shear is imparted to the mixture. Different screw geometries can be used to create the desired amount of shear mixing. Heating media are housed around the barrel and establish temperature zones in the barrel that are varied according to processing conditions known to those of skill in the art; the specific compounding conditions for this example are set forth in Table 2 below. For this example, the individual components of the Polyamide Composition are added to the twin-screw extruder in a first zone (Zone 1) and passed through a series of nine additional zones (Zones 2-10) that are heated to varying temperatures. A vacuum of about 100 mbar is drawn in Zone 8 to remove unwanted volatiles. Then, the Polyamide Composition is pushed through a strand die to form the strands which are cooled with water and pelletized. The Polyamide Composition, now pelletized, is subsequently extruded into test sheets on a single screw extruder with cast film die as described below.

TABLE 2

| Compounding Parameters | |
|---|---|
| Zone 1 Temperature (° C.) | 230 |
| Zone 2 Temperature (° C.) | 230 |
| Zone 3 Temperature (° C.) | 240 |
| Zone 4 Temperature (° C.) | 240 |
| Zone 5 Temperature (° C.) | 250 |
| Zone 6 Temperature (° C.) | 250 |
| Zone 7 Temperature (° C.) | 250 |
| Zone 8 Temperature (° C.) | 260 |
| Zone 9 Temperature (° C.) | 260 |
| Zone 10 Temperature (° C.) | 260 |
| Die Temperature (° C.) | 260 |
| Screw Speed (RPM) | 400 |
| Torque (Amps) | 70 |
| Production Rate (lb./hr.) | 180 |
| Melt Temperature (° C.) | 275 |
| Melt Pressure (PSI) | 150 |

The Polyamide Composition is extruded into test sheets on a single screw extruder a with cast film line. The test sheets are approximately 0.1 to 0.8 mm thick.

TABLE 3

| Extrusion Parameters | |
|---|---|
| Zone 1 Temperature (° C.) | 270 |
| Zone 2 Temperature (° C.) | 260 |
| Zone 3 Temperature (° C.) | 255 |
| Die Temperature (° C.) | 270 |
| Screw Speed (RPM) | 60 |
| Torque (Amps) | 4 |
| Production Rate (ft./min.) | 8 |
| Melt Temperature (° C.) | 275 |
| Melt Pressure (PSI) | 3200 |

The test sheets are tested to determine various physical and performance properties over a range of temperatures. Once formed, the test sheets are analyzed to determine Permeation Rate, Tensile Strength at 50% elongation at 23° C., Elongation at Break at 23° C., Izod Impact Strength at −40° C., and melting point. The test methods used and the results are set forth in Table 4 below.

TABLE 4

| Physical & Performance Properties | |
|---|---|
| Permeation Rate ($cm^3 \cdot mm/(m^2 \cdot day)$) ASTM F3985 | 5.6 |
| Tensile Strength, 50% Elongation, at 23° C. (psi) ASTM D638 | 26 |
| Elongation at Break, at 23° C. (%) ASTM D638 | 501 |

TABLE 4-continued

Physical & Performance Properties

| | |
|---|---|
| Elongation at Break, at −40° C. (%) ASTM 638 | — |
| Adhesion to Casing (XX) (Test Method) | — |
| $T_m$ (° C.) | 198 |
| Cyclic Fatigue (Cycles at 70° C., up to 40% Strain) | — |
| Izod, 23° C. (kJ/m2) ISO 179 | 112 |
| Izod, −40° C. (kJ/m2) ISO 179 | 138 |

As the results in Table 4 demonstrate, the polyamide composition and the article formed therefrom exhibits excellent physical properties over a wide range of temperatures. In view of these test results, the article formed from the polyamide composition can be utilized in applications, e.g., tire inner liners, which typically utilize other polymeric materials, e.g., halogenated butyl rubber.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present disclosure has been described in an illustrative manner, and it is to be understood that the terminology which has been used is intended to be in the nature of words of description rather than of limitation. Obviously, many modifications and variations of the present disclosure are possible in light of the above teachings. It is, therefore, to be understood that within the scope of the appended claims, the present disclosure may be practiced otherwise than as specifically described.

What is claimed is:

1. An inner liner for a pneumatic tire assembly, said inner liner comprising:
   A) the reaction product of:
      i. a polyamide in an amount of from 50 to 65 parts by weight per 100 parts by weight of said inner liner; and
      ii. an anhydride-functional copolymer in an amount of 15 to 35 parts by weight per 100 parts by weight of said inner liner; and
   B) a poly (ethylene-co-methacrylic acid) ionomer.

2. An inner liner as set forth in claim 1 wherein said poly (ethylene-co-methacrylic acid) ionomer is further defined as a zinc complex.

3. An inner liner as set forth in claim 1 wherein said anhydride-functional copolymer is further defined as a maleic anhydride modified ethylene-octene copolymer.

4. An inner liner as set forth in claim 1 wherein said polyamide composition further comprises a synthetic wax selected from the group of substituted amide waxes, metal stearates, and combinations thereof.

5. An inner liner as set forth in claim 1 having a specific gravity of from 0.8 to 1.15 g/cm$^3$.

6. An inner liner as set forth in claim 1 having an oxygen permeation rate of less than 100 cm$^3$•mm/(m$^2$•day) when tested in accordance with ASTM F3985.

7. A method of forming the inner liner set forth in claim 1 comprising the steps of compounding the polyamide, the anhydride-functional copolymer, and the poly (ethylene-co-methacrylic acid) ionomer and forming the inner liner.

8. An inner liner as set forth in claim 2 wherein said anhydride-functional copolymer is further defined as a maleic anhydride modified ethylene-octene copolymer.

9. An inner liner as set forth in claim 1 wherein said polyamide is selected from the group of polyamide 6, polyamide 6,6, polyamide 6/66, and combinations thereof.

* * * * *